Figure 5:
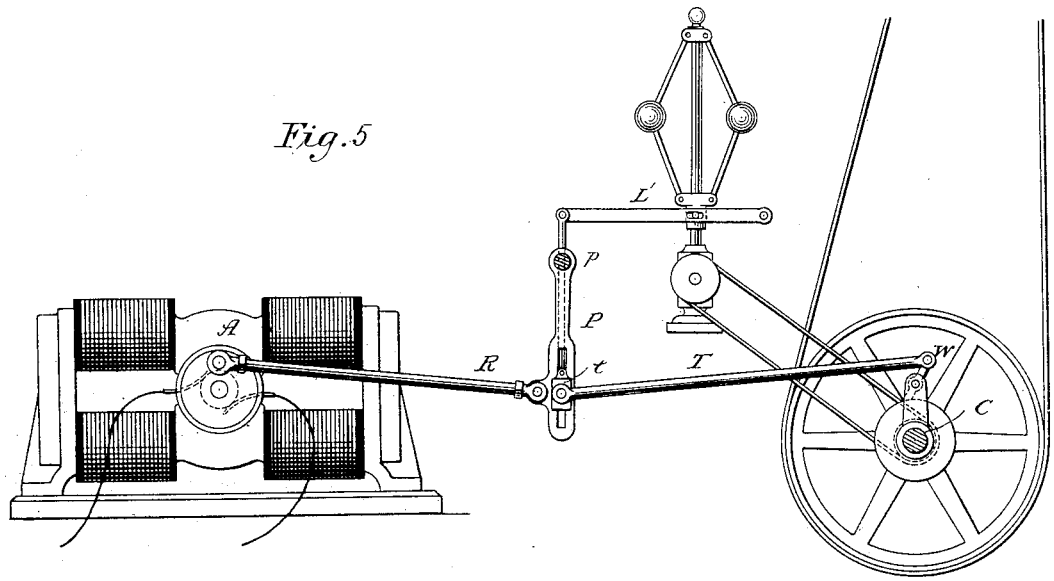

(No Model.) 3 Sheets—Sheet 1.
E. WESTON.
METHOD OF CONTROLLING THE ELECTRICAL TRANSMISSION OF POWER.
No. 273,329. Patented Mar. 6, 1883.
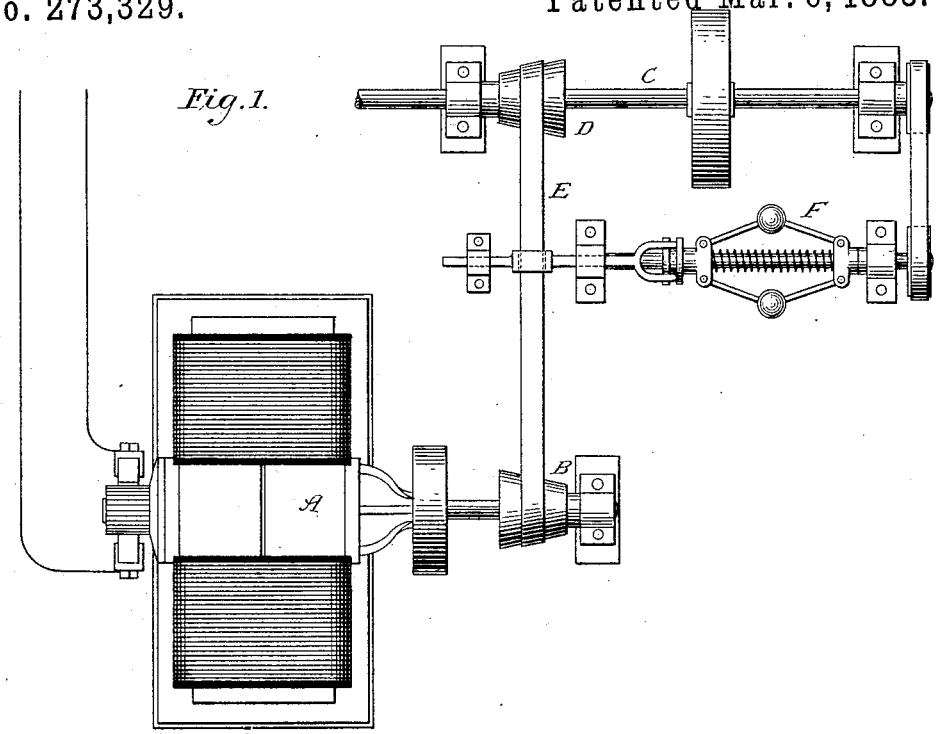
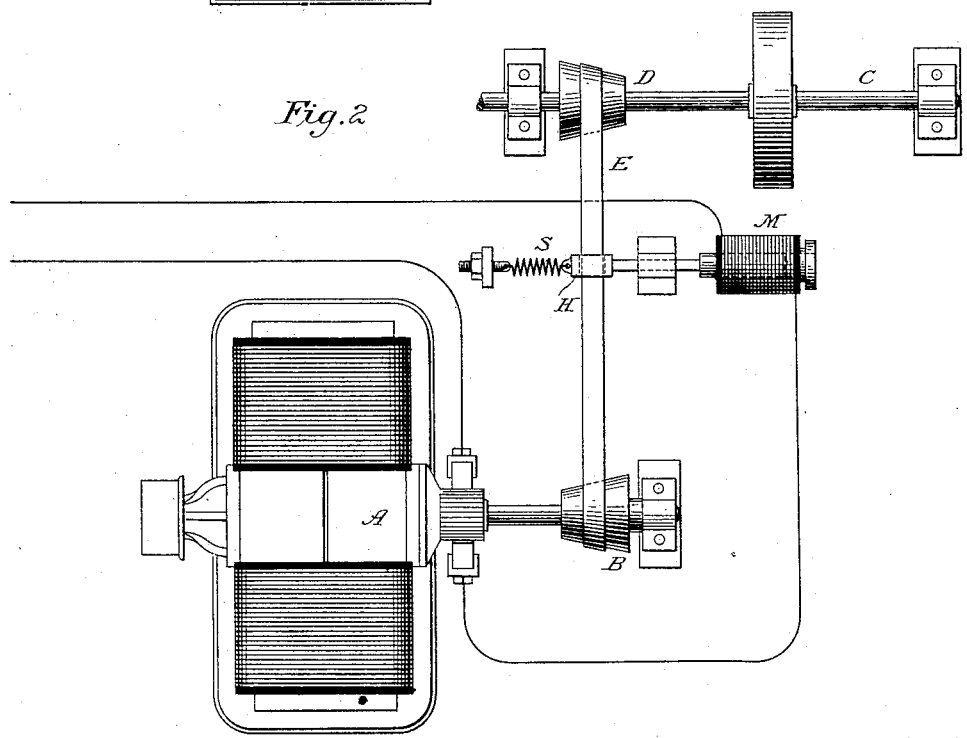
WITNESSES
Wm. A. Skinkle
Geo. W. Beck.
INVENTOR
Edward Weston
By his Attorney
Parker W. Page.

(No Model.) 3 Sheets—Sheet 2.
E. WESTON.
METHOD OF CONTROLLING THE ELECTRICAL TRANSMISSION OF POWER.
No. 273,329. Patented Mar. 6, 1883.
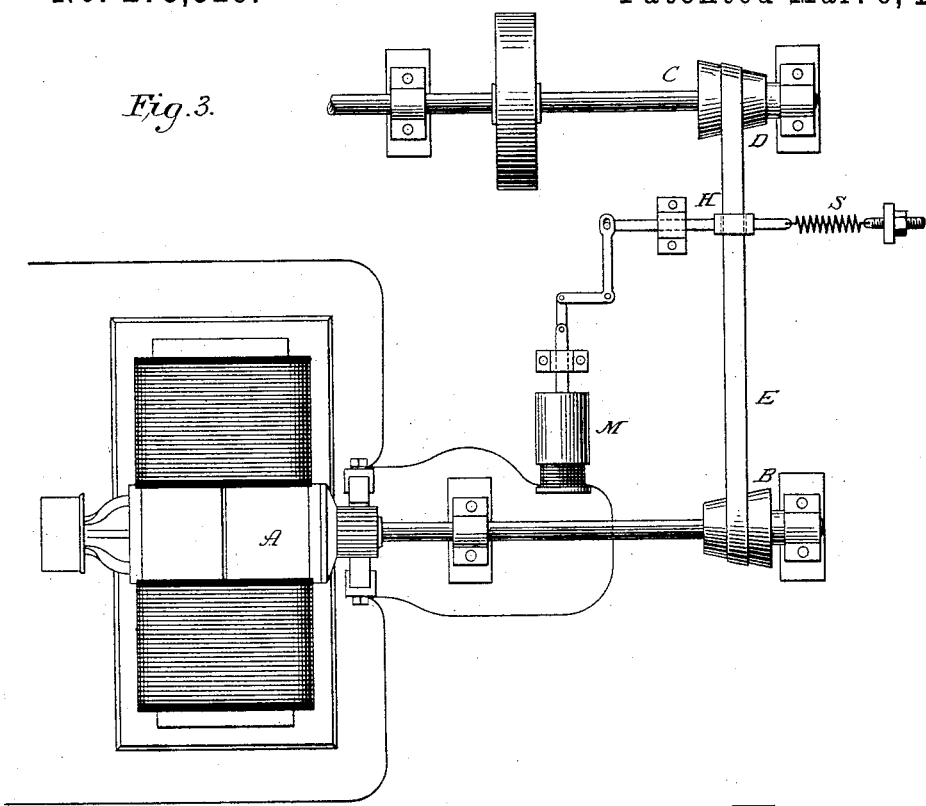
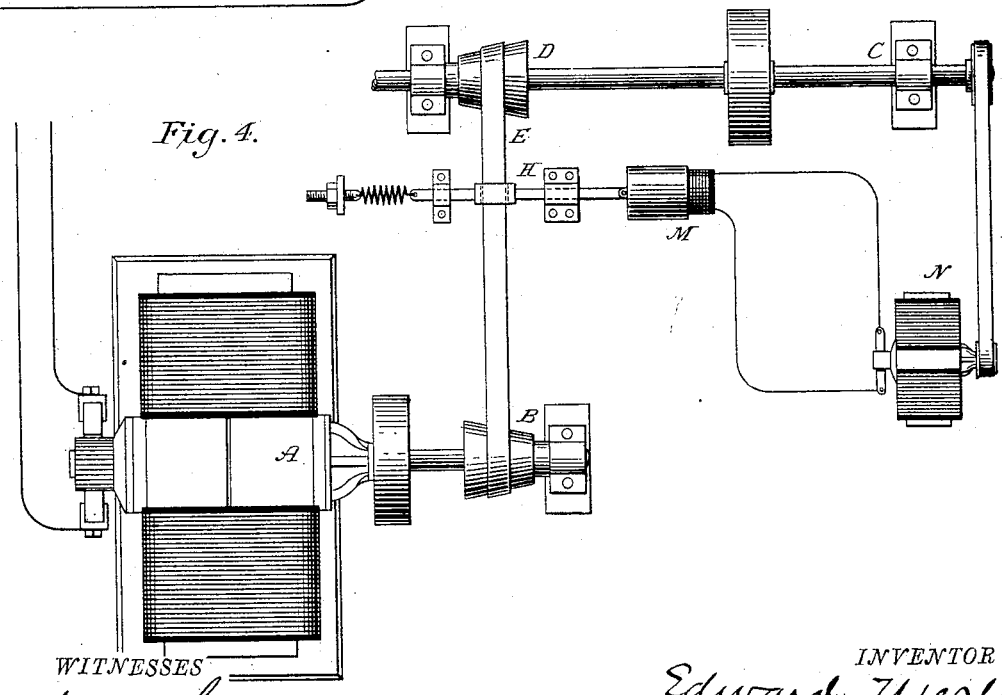
WITNESSES
Wm. A. Skinkle
Geo. W. Breck.
INVENTOR
Edward Weston
By his Attorney
Parker W. Page.
N. PETERS, Photo-Lithographer, Washington, D. C.

(No Model.) 3 Sheets—Sheet 3.

E. WESTON.
METHOD OF CONTROLLING THE ELECTRICAL TRANSMISSION OF POWER.

No. 273,329. Patented Mar. 6, 1883.

WITNESSES

INVENTOR
Edward Weston
By his Attorney

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

METHOD OF CONTROLLING THE ELECTRICAL TRANSMISSION OF POWER.

SPECIFICATION forming part of Letters Patent No. 273,329, dated March 6, 1883.

Application filed October 24, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Methods of Controlling the Electrical Transmission of Power, of which the following is a specification, reference being had to the drawings accompanying and forming a part of the same.

In the electrical transmission of power by means of electromotors in circuit with one or more generators which supply the current for operating them, the speed of the electromotor varies with variations in its load or the amount of work which it is called upon to do. If, for example, the electromotor is employed to drive a line-shaft from which several machines are driven, whenever one or more of the machines driven by the line-shaft are disconnected therefrom, the load upon the electromotor is diminished and its speed of rotation tends to correspondingly increase. An increase in the speed of rotation of the motor involves, of course, a like increase in the speed of rotation of the line-shaft which the motor drives. It has been heretofore sought to automatically prevent this increase in speed of rotation by governing the speed of the motor, this being usually attempted by the introduction of resistance or its equivalent into the main or field circuit of the generator supplying the current for driving the motor whenever the motor is relieved from portions of its load. It has also been proposed to automatically open the circuit whenever the speed of the motor rises or falls to a predetermined point; but inasmuch as both of these expedients involve the employment of electrical appliances more or less expensive and intricate in proportion to their efficiency, they are open to many objections and difficulties. When an electro-magnetic motor is included in the circuit with a dynamo-electric generator it develops in the circuit an electro-motive force opposed to that of the generator. Assuming, by way of illustration, that the generator and motor are of the same character and capacity, and disregarding entirely the retarding effects of friction, the resistance of the conductors connecting the two machines, and also the internal resistance of the machines themselves, it is evident that so long as the electro-motive force of the generator preponderates over the counter electro-motive force of the motor an amount of current energy represented by the difference of the two electro-motive forces will be transformed into the work of revolving the armature of the motor. The speed of the driven machine or motor will in consequence be increased, the tendency being toward the attainment of that rate of speed necessary to make its electro-motive force equal to that of the generator. If the motor is now made to do some work—as, for instance, to drive another machine—its speed of rotation, and consequently its counter electro-motive force, fall, and there is an increase in the amount of current energy manifested, which increase is proportionate to the amount of the added work. As a matter of fact, the disturbing elements of friction and resistance affect, to a greater or less extent, this law of operation, without, however, changing materially the general result; and it is therefore evident that the motor, if permitted to vary its speed of rotation according to the amount of work put upon it, is capable of automatically governing the quantity of current flowing, or, more properly stated, the amount of current energy transformed into work. By my invention this capacity of the motor is made use of as the means of automatically governing the amount of current energy transformed or expended, and I effect this result by operating on the motion-transmitting devices that connect the motor with the machine or shaft driven thereby, varying the action or effect of said devices in such manner as to maintain the speed of the driven machine constant, while permitting the motor to revolve at a varying speed that is determined by its load. In practice I employ mechanism by means of which this is automatically effected in various ways, and in describing the invention more in detail I shall briefly refer to several of the various appliances designed by me for this purpose in illustration of the principle involved. Each of the figures of the drawings hereto annexed is designed as a diagram illustrating a motor and a shaft driven by the same.

In Figs. 1, 2, 3, 4 the device for transmitting the motion of the motor to the driven shaft is a belt running on conical pulleys. The invention is therefore carried out in these cases if the belt be shifted from one side of the motor-pulley to the other in proportion to variations in the load on the driven shaft. A very simple and convenient means for doing this is shown in Fig. 1. A, the motor, has a cone-pulley, B, on its shaft. C, the driven shaft or machine, carries also a cone-pulley, D. A belt, E, runs over the two pulleys. A centrifugal governor, F, is driven by the shaft C and operates a shifting mechanism in connection with the belt E. Should the load on the driven shaft be lessened, the speed of the motor runs up; so, also, does that of the shaft C; but this causes the governor-balls to fly apart, by which the slide H is pulled up and the belt E shifted toward the small end of the motor-pulley. As a consequence, the shaft C is not driven above its normal speed, though the motor runs faster. By this arrangement the speed of shaft C may be maintained practically uniform by properly adjusting the governor and motion-transmitting devices. Another way of attaining the same end is illustrated in Fig. 2, where a helical magnet, M, in the main or motor circuit takes the place of the centrifugal governor. In this case a shifting slide, H, is connected with the core of the helix M, and a spring, S, is connected therewith, that acts in opposition to the attractive force of the helix. The greater the load on the shaft C in this case the slower the speed of the motor. A corresponding fall in the counter electro-motive force developed thereby takes place, so that magnet M becomes stronger, and, pulling against spring S, shifts the belt E over to the larger end of the motor-pulley. The converse of this will be readily understood. In Fig. 3 the magnet M is placed on the opposite side of the belt E, and, in lieu of being in the motor-circuit, is in a shunt about the motor. In this case the amount of current passing through the coils of the magnet increases with the speed of the motor, the counter electro-motive force of the latter acting to divert more current as it increases. The belt E will, in consequence of this varying attraction, be shifted so as to maintain the speed of shaft C always the same.

The magnet M, in lieu of being connected in any way with the motor-circuit, may be in the circuit of an independent machine driven by the motor or the driven shaft. For instance, in Fig. 4 a small machine, N, is run by the driven shaft C. The faster C revolves the stronger the attraction of magnet M becomes and the nearer to the smaller end of pulley B the belt E is drawn.

Figure 6:
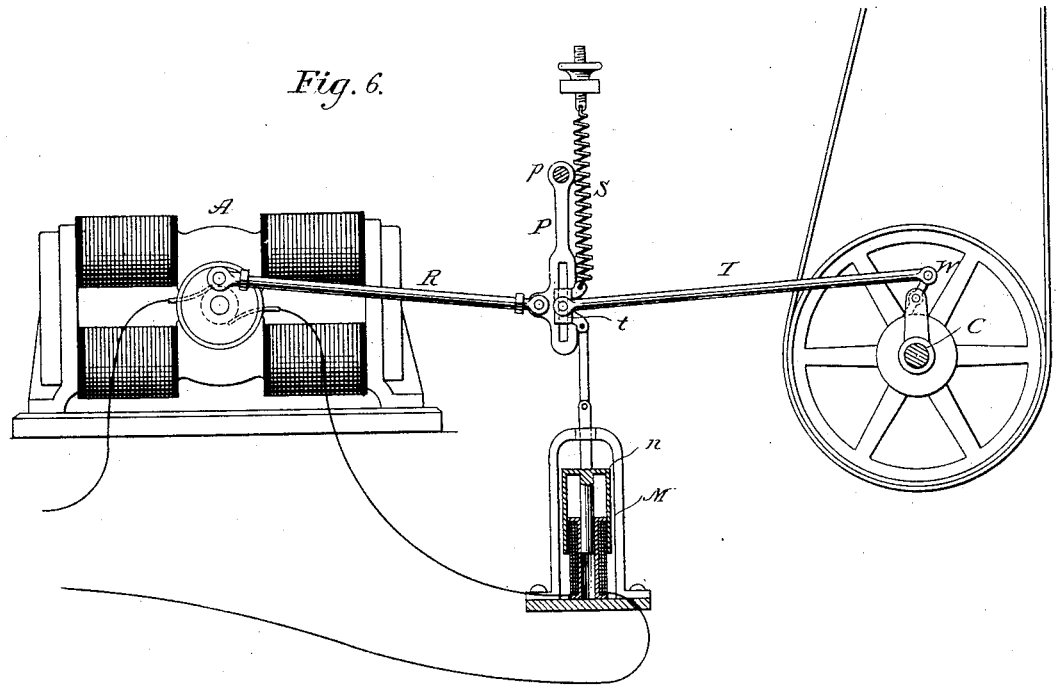

In illustration of other ways in which motion may be transmitted, Figs. 5 and 6 are presented. In the former a bar, P, pivoted at $p$, is oscillated by a connecting-rod, R, that receives motion from the motor-shaft. A second rod, T, pivoted to a slide, $t$, sinking in a slot, V, in the bar P, is connected with a friction-pawl, W, or its mechanical equivalent, that operates upon a disk fixed to the shaft that is to be driven. A centrifugal governor is driven by the shaft C, and is connected with a lever, L', that shifts the position of the slide $t$. As the slide $t$ is raised the length of stroke of rod T is reduced, and conversely. It is obvious, therefore, that as the load on shaft C decreases the slide $t$ will be carried up in the slot V by the lever L', and the speed of rotation of the shaft C maintained the same, although that of the motor may be increased. As another means of shifting the slide and varying the stroke, the arrangement shown in Fig. 6 may be used. In this case a magnet, M, is included in the motor-circuit, its armature $m$ is connected with the slide $t$, and a spring, S, acts in opposition to the magnet. The action of this will be readily understood by reference to the description of Figs. 2 and 5.

I have described but a few of the numerous ways in which the invention may be practically carried into effect. I do not herein specifically claim the devices which I have described, as I have made them the subject of other applications.

What I claim is—

The method of regulating the electrical transmission of power, which consists in varying the action or effect of the motion-transmitting devices connecting the motor with the driven machine in accord with varying increments and decrements in the speed of the motor, substantially in the manner herein set forth, whereby the speed of the driven machine is maintained uniform and constant through all variations in the speed of the motor.

In testimony whereof I have hereunto set my hand this 21st day of October, 1882.

EDWARD WESTON.

Witnesses:
HENRY A. BECKMEYER,
PARKER W. PAGE.